United States Patent
Egeland et al.

(10) Patent No.: US 8,535,581 B2
(45) Date of Patent: Sep. 17, 2013

(54) INDUCTION FURNACE FOR MELTING OF METALS, LINING FOR AN INDUCTION FURNACE AND METHOD FOR PRODUCTION OF SUCH LINING

(75) Inventors: Bjørn Egeland, Slemmestad (NO); Alf Håberg, Kristiansand (NO); Stian Madshus, Kristiansand (NO); Johan Arnold Johansen, Kristiansand (NO)

(73) Assignee: Elkem Carbon AS, Oslo (NO)

(*) Notice: Subject to any disclaimer, the term of this patent is extended or adjusted under 35 U.S.C. 154(b) by 0 days.

(21) Appl. No.: 13/456,936

(22) Filed: Apr. 26, 2012

(65) Prior Publication Data

US 2012/0205829 A1    Aug. 16, 2012

Related U.S. Application Data

(60) Division of application No. 13/090,734, filed on Apr. 20, 2011, which is a continuation-in-part of application No. PCT/NO2009/000364, filed on Oct. 19, 2009.

(30) Foreign Application Priority Data

Oct. 31, 2008   (NO) .................................... 20084613

(51) Int. Cl.
F27D 1/16    (2006.01)
B29B 15/00   (2006.01)
B29C 71/02   (2006.01)

(52) U.S. Cl.
USPC ............................................. 264/30; 264/340

(58) Field of Classification Search
USPC ..................................................... 264/30, 340
See application file for complete search history.

(56) References Cited

U.S. PATENT DOCUMENTS

2006/0140245 A1*   6/2006   Wynn et al. ................... 373/138

OTHER PUBLICATIONS

McGraw-Hill Science & Technology Dictionary McGraw-Hill Dictionary of Scientific and Technical Terms. Copyright © 2003, 1994, 1989, 1984, 1978, 1976, 1974 by McGraw-Hill Companies, Inc. from http://www.answers.com/topic/novolac-resin, downloaded Apr. 16, 2013.*

* cited by examiner

Primary Examiner — George Wyszomierski
Assistant Examiner — Tima M McGuthry Banks
(74) Attorney, Agent, or Firm — Lucas & Mercanti, LLP

(57) ABSTRACT

The present invention relates to an induction furnace for melting of metals that do not connect inductively in solid state. The induction furnace has a lining comprising a mixture of graphite and silicon carbide and has an electric conductivity higher than the electrical conductivity of the metal to be melted when metal is in solid state, but lower than the electrical conductivity of the metal to be melted when the metal is in molten state. The invention further relates to a lining for induction furnace and to a method for producing such lining.

11 Claims, 5 Drawing Sheets

INDUCTION FURNACE FOR MELTING OF METALS, LINING FOR AN INDUCTION FURNACE AND METHOD FOR PRODUCTION OF SUCH LINING

CROSS-REFERENCE TO RELATED APPLICATION

This application is a Divisional Application of U.S. patent application Ser. No. 13/090,734 filed Apr. 20, 2011, which in turn was a Continuation In Part of International application PCT/NO2009/000364 filed Oct. 19, 2009, which in turn claims the benefit of priority from NO 20084613 filed Oct. 31, 2008, the contents of each of these applications are incorporated herein by reference.

TECHNICAL FIELD

The present invention relates to an induction furnace for melting of metals, particularly silicon, and more particularly to a lining for such furnace.

TECHNICAL BACKGROUND

By melting of metals in induction furnaces most metals have such high electrical conductivity that they connect inductively in solid state. For melting of such metals in induction furnaces the electrical properties of the lining in the induction furnace is not important and the lining can be made from electric isolating materials. Metals having a low electrical conductivity when they are in solid state, such as silicon and germanium, will however not connect inductively when they are in solid state. In order to start the melting process it must be used a susceptor which is inserted into the furnace at the start of the melting process of solid silicon or the lining must be made from an electrically conductive material that connects inductively, such as graphite. When using graphite as lining the melting will take place indirectly as the graphite lining will be heated by induction and where the metal is heated by heat radiation from the graphite lining. As graphite also has a higher electrical conductivity than molten silicon, the heat transfer during the whole melting period, also when part of the silicon is in molten state, will be based on inductive heating of the graphite lining. This has disadvantages as the graphite lining during the whole melting period will be the hottest part of the induction furnace. This requires a very comprehensive cooling of the graphite lining causing high heat losses. Further the graphite lining, the induction coil and the cooling system for the lining will be subjected to high thermal stress.

SUMMARY OF THE INVENTION

By the present invention it is provided an induction furnace for metals having a low electric conductivity, particularly silicon and germanium, where the lining is heated by induction at the start of melting of solid metal, while the main part of the heating when at least a part of the metal has melted, is done by inductive connection to the molten metal and not to the lining. It is further provided a lining for an induction furnace where the electrical conductivity of the lining can be tailormade during the production of the lining in such a way that the electrical conductivity of the lining is adjusted according to the metal to be melted in the induction furnace. The furnace of the present invention preferably does not apply a susceptor.

The present invention thus relates to an induction furnace for melting of metals that do not connect inductively in solid state, said induction furnace having a lining comprising of a mixture of graphite and silicon carbide and has an electric conductivity higher than the electrical conductivity of the metal to be melted when metal is in solid state, but lower than the electrical conductivity of the metal to be melted when the metal is in molten state.

The lining preferably comprises about 80 to about 20% by weight of graphite and about 20 to about 80% by weight of silicon carbide and more preferably the lining comprises about 70 to about 30% by weight of graphite and about 30 to about 70% by weight of silicon carbide.

The electrical conductivity of the lining can be tailormade to an electrical conductivity relative to the electrical conductivity for the metal to be melted by regulating the content of silicon carbide in the lining, as the electrical conductivity in the lining will be reduced with increasing content of silicon carbide. The weight ratio of graphite to silicon carbide in the lining is about 4:1 to about 1:4, and more preferably about 7:3 to about 3:7.

The present invention further relates to a lining for use in induction furnaces for melting of metals which do not connect inductively in solid state, which lining has a higher electrical conductivity than the metal to be melted when the metal is in solid state, but lower than the electrical conductivity for the metal to be melted when the metal is in molten state.

The lining can be in the form of a self-sustaining crucible that can be exchanged very easily.

When using the induction furnace according to the present invention for melting of metals having a low electrical conductivity which do not connect inductively in solid state, such as silicon and germanium, the lining in the induction furnace at the start of a melting cycle when the furnace at the start is filled with solid metal, will connect inductively and thereby be heated. The solid metal in the furnace will thereby be heated by radiation from the lining. When part of the metal has melted the molten metal which has a far higher electrical conductivity than the solid metal, will connect inductively and the heat energy will be supplied directly to the molten metal. Thus the lining will only be subjected to very high temperature at the start of each melting cycle. A far better energy utilization will thereby be achieved as the heat energy is transferred directly to the molten metal in the furnace and consequently the heat stress on the lining will be substantially reduced. The need for cooling of the lining and of other parts of the furnace will thus also be reduced. This results in a substantially increased lifetime of the lining.

The lining according to the present invention further has the advantage that it can be made from very clean materials. For example, ball clay, bentonite, and other clays must be excluded from the lining of the present invention. Silica and alumina may be included in amounts of up to about 5% by weight. Graphite fibers can be in the mixture of the present invention which may have a length of between about 3 mm to about 12 mm. When graphite fibers are included, the amount of graphite particles in the mix should be reduced in order to keep the total graphite content constant.

The present invention further relates to a method for making a lining for induction furnaces where the electrical conductivity for the lining can be adjusted to fit the metal that is to be melted in the furnace, which method is being characterized in that a mixture of graphite particles, silicon carbide particles and a carbon-based binder is formed to a lining whereafter the formed lining is cured and baked at a temperature above about 1100° C. where the electrical conductivity of the lining is adjusted by adjusting the ratio between the graphite particles and the silicon carbide particles.

Preferably the mixture comprises about 20 to about 80% by weight of graphite particles and about 80 to about 20% by weight of silicon carbide particles and carbon-based binder in an amount of about 10 to about 25% based on the weight of the mixture of graphite particles silicon carbide particles.

The range particle size for silicon particles is from about 10 μm to about 100 μm.

More preferably the mixture comprises about 30 to about 70% by weight of graphite particles and about 70 to about 30% by weight of silicon carbide and a carbon-based binder in an amount of about 11 to about 18% based on the weight of the mixture of graphite particles and silicon carbide particles.

The range of particle size of graphite particles and silicon carbide particles is from about 0.01 mm to about 5 mm.

The carbon-based binder is selected from among natural resins, synthetic resins such as phenol formaldehyde resin, furfuryl alcohol or tar-based binders such as petroleum coke pitch or tar pitch.

When a synthetic or natural resin is used as a binder, a curing agent selected among hexamine and organic or inorganic acids are preferably added to the binder.

When the carbon-based binder is added to the mixture of graphite particles and silicon carbide particles, this will provide a good strength at low temperatures. During heating and baking the binder will carbonize and form a solid carbon. In addition the use of carbon-based binder results in a more dense lining which prevents penetration of molten metal into the lining.

It is further preferred to add silicon particles to the mixture of graphite particles, silicon carbide particles and carbon-based binder in an amount sufficient for the carbon that forms during carbonization of the binder to react to SiC. Calculated on weight %, the weight % of silicon in the mix will be about equal to the weight % of binder.

The present invention can be defined as follows:
1. An induction furnace for melting metal where the metal does not connect inductively when the metal is in a solid state but does connect inductively when the metal is in a molten state, the furnace comprising:
    an outside housing having an inductive coil; and
    a liner in the housing,
the liner comprising a mixture of graphite and silicon carbide, the liner having an electrical conductivity higher than the electrical conductivity of a metal to be melted when the metal is in a solid state but lower than the electrical conductivity of the metal to be melted when the metal is in a molten state.
2. The furnace of item 1, wherein the liner comprises about 80 to about 20% by weight graphite and about 20 to about 80% by weight silicon carbide.
3. The furnace of item 1, wherein the liner comprises about 70 to about 30% by weight graphite and about 30 to about 70% by weight silicon carbide.
4. A liner for an induction furnace for melting metal where the metal does not connect inductively when the metal is in a solid state but does connect inductively when the metal is in a molten state, the liner comprising:
    a mixture of graphite and silicon carbide,
the liner having an electrical conductivity higher than the electrical conductivity of a metal to be melted when the metal is in a solid state but lower than the electrical conductivity of the metal to be melted when the metal is in a molten state.
5. The liner of item 4, wherein the liner comprises about 80 to about 20% by weight graphite and about 20 to about 80% by weight silicon carbide.
6. The liner of item 4, wherein the liner comprises about 70 to about 30% by weight graphite and about 30 to about 70% by weight silicon carbide.
7. A method for making a liner for an induction furnace for melting metal where the metal does not connect inductively when the metal is in a solid state but does connect inductively when the metal is in a molten state, the method comprising:
    mixing graphite particles, silicon carbide particles and a carbon based binder to form a mixture;
    forming a green liner for an induction furnace from the mixture;
    heating the green liner to a temperature above about 1100° C. to cure and bake the green liner and make a liner; and
    adjusting the electrical conductivity of the liner so that the liner has a higher electrical conductivity than the electrical conductivity of the metal to be melted when the metal is in a solid state but lower than the electrical conductivity of the metal to be melted when the metal is in a molten state.
8. The method of item 7, wherein adjusting the electrical conductivity of the liner comprises regulating the ratio of graphite particles and silicon carbide particles in the mixture.
9. The method of item 8, wherein the mixture comprises about 80 to about 20% by weight graphite particles, about 20 to about 80% by weight silicon carbide particles and the carbon-based binder is present in an amount of about 10 to about 25% by weight based on the combined weight of graphite particles and silicon carbide particles in the mixture.
10. The method of item 8, wherein the mixture comprises about 70 to about 30% by weight graphite particles and about 30 to about 70% by weight silicon carbide particles and the carbon-based binder is present in an amount of about 11 to about 18% by weight based on the combined weight of graphite particles and silicon carbide particles in the mixture.
11. The method of item 7, wherein the carbon-based binder is selected from the group consisting of natural resins, synthetic resins and tar-based binders.
12. The method of item 7, wherein the carbon-based binder is selected from the group consisting of phenol formaldehyde resin and furfuryl alcohol.
13. The method of item 7, wherein the mixture further comprises a curing agent.
14. The method of item 13, wherein the curing agent is selected from the group consisting of hexamin and inorganic acids.
15. The method of item 7, wherein the binder is petroleum coke pitch or tar pitch.
16. The method of item 7, wherein the mixture further comprises silicon particles in an amount sufficient for carbon that form during heating from the binder, reacts with the silicon particles to SiC.
17. The method of item 7, wherein forming and heating are conducted outside an inductive furnace.
18. The method of item 7, wherein forming and heating are conducted inside an inductive furnace.
19. A method for melting a metal in an induction furnace comprising:
    providing an induction furnace comprising:
    an outside housing having an inductive coil; and
    a liner in the housing,
    the liner comprising a mixture of graphite and silicon carbide,
    the liner having an electrical conductivity higher than the electrical conductivity of a metal to be melted when the metal is in a solid state but lower than the electrical conductivity of the metal to be melted when the metal is in a molten state;

adding to the induction furnace a metal where the metal does not connect inductively when the metal is in a solid state and the induction coil is on but does not connect inductively when the metal is in a molten state and the induction coil is on;

supplying electrical energy to the induction coil to melt the metal; and removing melted metal from the induction furnace.

20. The method of item 19, wherein removing comprises removing a substantial portion of the melted metal from the furnace and leaving a pool of melted metal in the furnace for the start of a second adding.

SHORT DESCRIPTION OF THE DRAWINGS

DETAILED DESCRIPTION OF INVENTION

Figure 1:
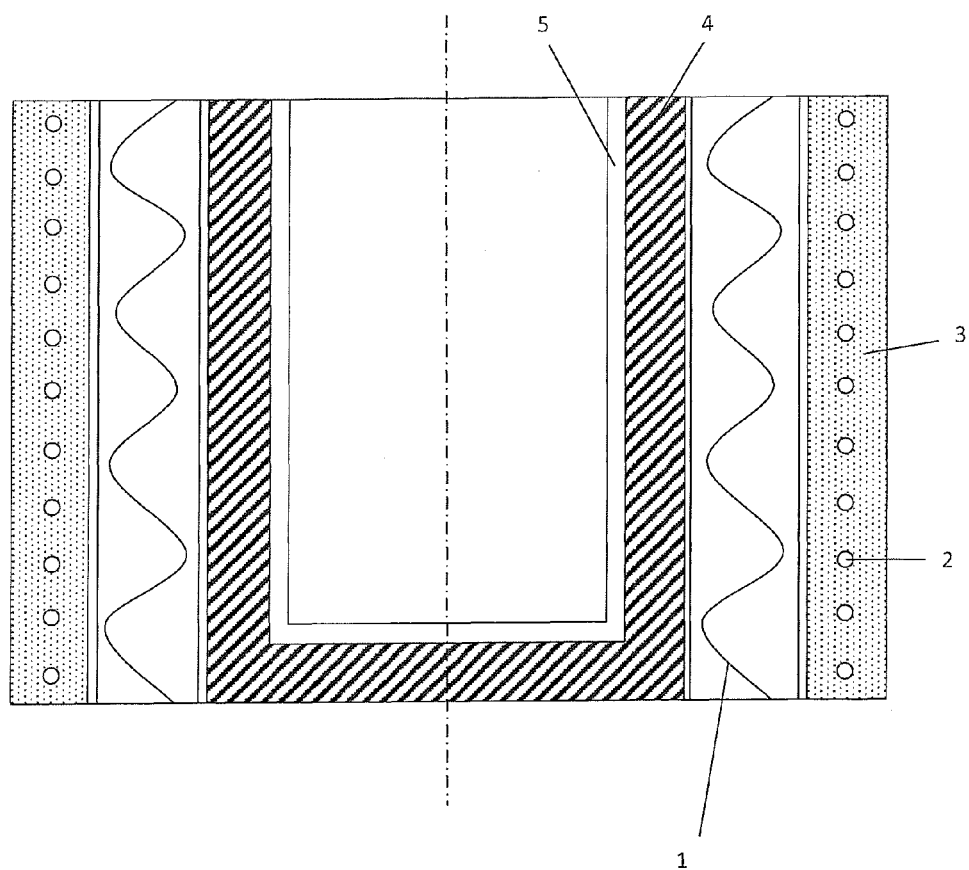
FIG. 1 shows a vertical cut through an induction furnace according to the invention.

In FIG. 1, there is shown an embodiment of the induction furnace according to the present invention, comprising an insulating lining 1 which on the outside has an induction coil 2 embedded in a refractory material 3. The insulation lining 1 can consist of a refractory material that does not react with carbon, such as $Al_2O_3$. On the inside of the insulation lining 1 it is arranged a lining 4 according to the invention comprising a mixture of graphite, silicon carbide, carbon-based binder and optionally silicon particles. An inner steel form part 5 is used when tamping the lining 4. The lining is cured at a temperature between about 150 and about 600° C. and is baked at a temperature above about 1100° C. The curing temperature is dependent on the type of carbon-based binder that is used. Such curing and baking are done in a conventional manner using conventional equipment.

The amount of silicon carbide is adjusted to obtain an electrical conductivity that one wants in the lining. Generally the amount of silicon carbide is adjusted in such a way that the electrical conductivity of the baked lining 4 is higher than the electrical conductivity of the metal that is to be melted in the induction furnace when the metal is in solid state, but lower than the electrical conductivity for the metal to be melted when the metal is in molten state. The amount of silicon carbide in the baked lining 4 is between about 20 and about 80% by weight, and more preferred between about 30 and about 70% by weight.

Those of ordinary skill in the art would be able to calculate the electrical conductivity of the lining based on the amount of electrical conductive material (e.g., graphite) and the amount of electrical non-conductive material (e.g., silicon carbide) in the lining. Another way of adjusting the electrical conductivity would be to make samples with different content of silicon carbide and graphite, baking the samples, and measuring the electrical conductivity. Such measurements are done in a conventional manner using conventional equipment.

Figure 2:
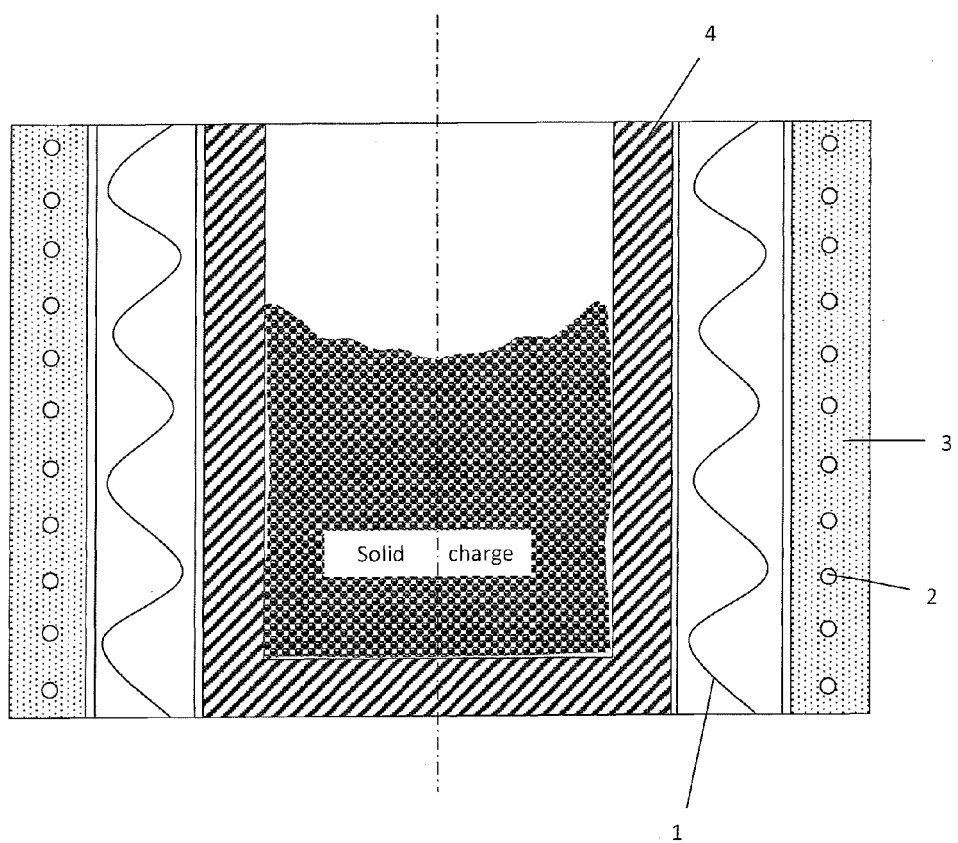
FIG. 2 shows a vertical cut through an induction furnace according to the invention, where the metal is in solid state.

In FIG. 2, there is shown another embodiment of the induction furnace according to the present invention, which shows the charge in solid state. The induction furnace comprises an insulating lining 1, induction coil 2 embedded in a refractory material that does not react with carbon, and lining comprising a mixture of graphite, silicon carbide, carbon-based binder and optionally silicon particles. An inner steel form part 5 is not present in this embodiment. The inner steel form part 5 is only used to make the tamping for lining 4 prior to curing and baking the lining. Those with ordinary skill in the art would know that the mixing of the materials are done utilizing equipments and tools conventionally known and used in the art.

Figure 3:
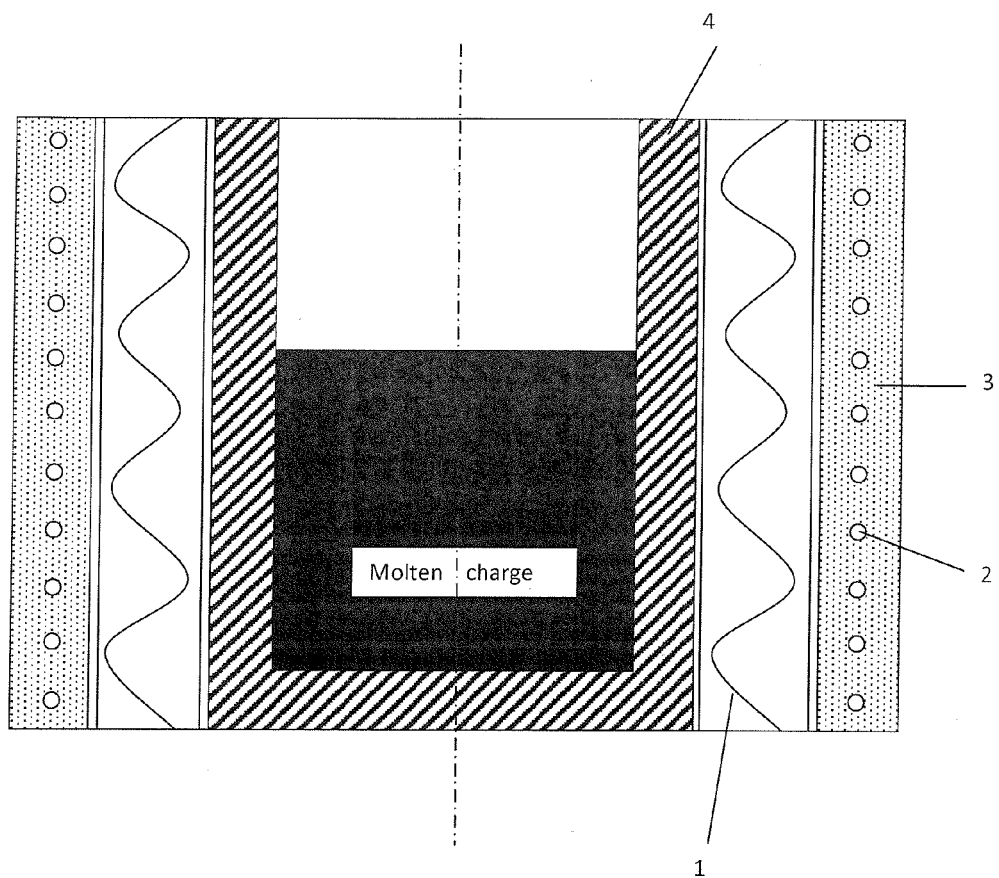
FIG. 3 shows a vertical cut through an induction furnace according to the invention, where the metal is in molten state.

Before start up of a melting cycle the induction furnace is filled with solid metal. When supplying electric energy to the coil 2 the lining 4 will connect inductively, while the metal to be melted will not connect inductively. In this first period of the melting cycle the lining 4 will therefore be heated due to induction and heat will be transferred by heat radiation from the lining to the solid metal. When the metal starts to melt the electrical conductivity of the molten metal will be higher than the electrical conductivity of the lining 4. The molten metal will thereby connect inductively and a part of the supplied energy will thereby be transferred directly to the molten metal. When further amounts of metal melts, a larger and larger part of the electrical energy supplied will be transferred directly to the molten metal. The thermal stress on the lining 4 will thus be substantially reduced during the remaining part of the melting process. FIG. 3 shows this embodiment of the induction furnace, wherein the charge in molten state.

Figure 5:
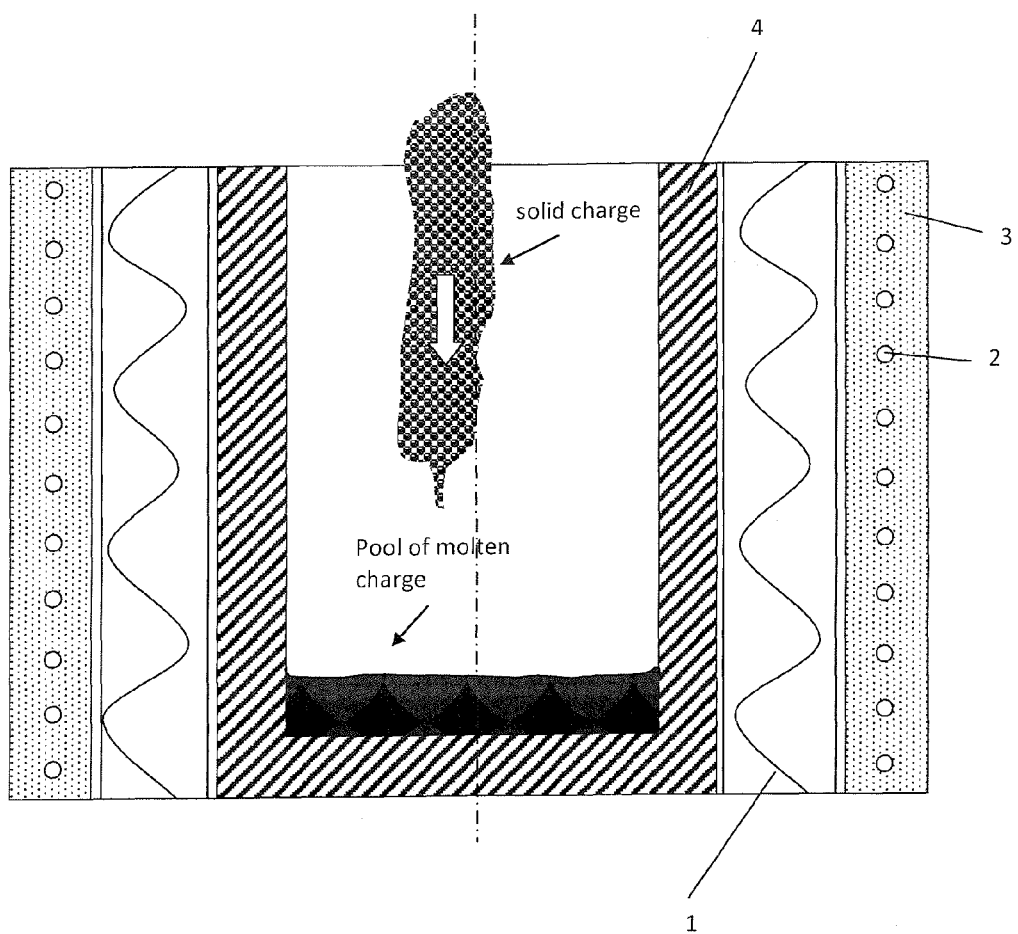
FIG. 5 shows a vertical cut through an induction furnace according to the invention, where a pool of melted metal is left in the furnace for the start of a second adding of the metal in solid state.

When the melting is finished the molten metal is poured from the furnace, but in such a way that a pool of molten metal remains in the induction furnace, for instance about 25%. Thus at the start of the next melting cycle this pool of molten metal will connect inductively. FIG. 5 shows this embodiment, where the solid metal is added into the pool of molten metal left from the previous melting cycle.

Although there is no definite range for thickness of the lining, those of ordinary skill in the art would appreciate the fact that the lining can have varied thickness, i.e., a thickness which can withstand the mechanical forces during the use of the lining. This means that a lining of a furnace with larger diameter must be thicker than linings of a furnace with smaller diameter. For example, for commercial linings, the thickness would be at least about 20 mm.

Those of ordinary skill in the art would also appreciate that there is no upper limit for the temperature for baking the lining. Without being bound by any theory but solely for purposes of explanation, those of skill in the art can understand that, for example, in practice, the upper temperature for baking of the liner is about 1500° C.

Example 1

Production of Lining in Furnace

A lining for a 75 kW induction furnace operating at a frequency of 3000 Hz was produced as follows: On the inside of the refracting layer 3 with the embedded coil 2 (FIG. 1) an insulating refractory layer 1 was cast. The insulating refractory layer 1 consisted of 96% by weight of $Al_2O_3$, the remaining being impurities such as $SiO_2$, CaO and FeO. The thickness of the insulating refractory layer 1 was 25 mm. On the inside of the insulating refractory 1 it was tamped a lining 4 consisting of a powder mixture of 40% by weight graphite powder, 49% by weight silicon carbide and 11% by weight of silicon particles. To this mixture it was added 14.3% phenol formaldehyde resin binder based on the weight of the mixture of graphite particles, silicon carbide particles and silicon particles. To the binder it was added hexamin as a curing agent. The lining was thereafter cured and baked by placing a susceptor in a form of a graphite cylinder in the center of the furnace together with a thermocouple. The curing and baking of the lining 4 was done at a heating rate of maximum 100° C. per hour to a temperature of 1500° C.

Example 2

Production of Lining Outside of Induction Furnace

Figure 4:
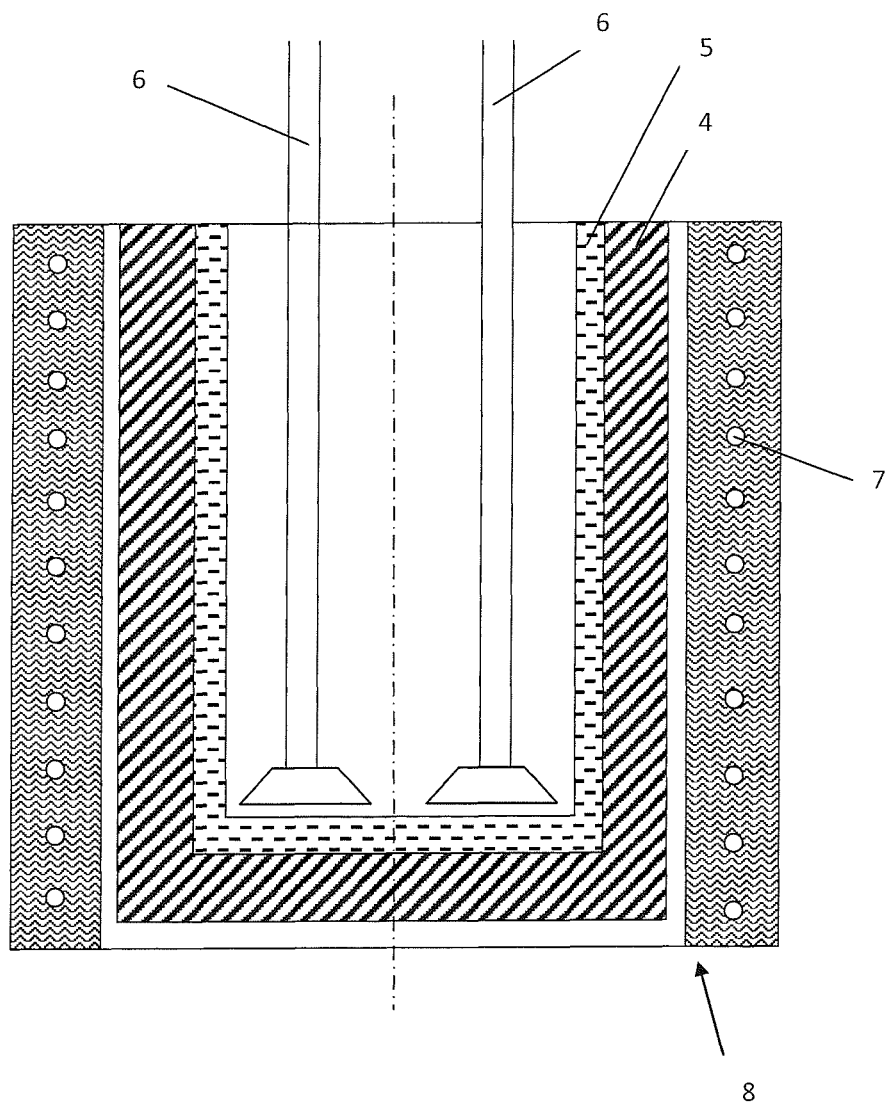
FIG. 4 shows a vertical cut through a lining outside an induction furnace according to the invention.

The lining 4 can alternatively be made separately outside the induction furnace by tamping the lining 4 between outer and inner mould parts. After tamping, the inner mould part is removed whereafter the lining is cured. The outer mould part is thereafter removed and the cured lining is placed in a suitable furnace or heating reactor where it is baked at temperature of above 1100° C. FIG. 4 shows this embodiment providing a piston 6 used for tamping the lining 4, an inner mould part 5, and coil 7 of a furnace or heating reactor 8. The method for coating the inside of the furnace with the mixture and forming the green liner with the inner mould part 5 and piston 6 is done in a conventional manner using conventional equipment. After the lining is removed from the furnace or heating reactor 8, it is placed in the induction furnace.

Example 3

The lining of Example 1 was tested for inductivity at 1000° C. At start of the supply of electric energy to the induction coil 2 the furnace took maximum effect of 75 kW at once. Thereafter solid silicon was supplied to the furnace and melted. After melting and pouring of the silicon from the furnace, the lining was allowed to be cooled to 200° C. and again tested for inductivity at maximum effect of 75 kW. The lining then took 65 kW. The effect taken by the lining was thus reduced by 15%. This shows that during curing and baking of the lining the conductivity of the lining is increased such that it connects inductively.

Example 4

Melting of Silicon

Chunks of silicon were filled into the furnace of Example 1 and electrical energy was supplied to the induction coil such that the liner was heated to 1550° C. Melting started when the supplied effect reached 45 kW. A total of 15 kg silicon was melted in 55 minutes. A good movement of the molten bath was observed which shows that a major part of the energy supplied was transferred directly to the molten silicon.

We claim:

1. A method for making a liner for an induction furnace for melting metal where the metal does not connect inductively when the metal is in a solid state but does connect inductively when the metal is in a molten state, the method comprising:
   mixing graphite particles, silicon carbide particles and a carbon based binder to form a mixture;
   forming a green liner for an induction furnace from the mixture;
   heating the green liner to a temperature above about 1100° C. to cure and bake the green liner and make a liner; and
   adjusting the electrical conductivity of the liner by regulating the ratio of graphite particles and silicon carbide particles in the mixture so that the liner has a higher electrical conductivity than the electrical conductivity of the metal to be melted when the metal is in a solid state but lower than the electrical conductivity of the metal to be melted when the metal is in a molten state,
   wherein the forming of the green liner is conducted outside an inductive furnace.

2. The method of claim 1, wherein the mixture comprises about 80 to about 20% by weight graphite particles, about 20 to about 80% by weight silicon carbide particles and the carbon-based binder is present in an amount of about 10 to about 25% by weight based on the combined weight of graphite particles and silicon carbide particles in the mixture.

3. The method of claim 1, wherein the mixture comprises about 70 to about 30% by weight graphite particles and about 30 to about 70% by weight silicon carbide particles and the carbon-based binder is present in an amount of about 11 to about 18% by weight based on the combined weight of graphite particles and silicon carbide particles in the mixture.

4. The method of claim 1, wherein the carbon-based binder is selected from the group consisting of natural resins, synthetic resins and tar-based binders.

5. The method of claim 1, wherein the carbon-based binder is selected from the group consisting of phenol formaldehyde resin and furfuryl alcohol.

6. The method of claim 1, wherein the mixture further comprises a curing agent.

7. The method of claim 6, wherein the curing agent is selected from the group consisting of hexamin and inorganic acids.

8. The method of claim 1, wherein the binder is petroleum coke pitch or tar pitch.

9. The method of claim 1, wherein the mixture further comprises silicon particles in an amount sufficient for carbon that form during heating from the binder, reacts with the silicon particles to SiC.

10. The method of claim 1, wherein the heating is conducted inside the inductive furnace.

11. A method for making a liner for an induction furnace for melting metal where the metal does not connect inductively when the metal is in a solid state but does connect inductively when the metal is in a molten state, the method comprising:
    mixing graphite particles, silicon carbide particles and a carbon based binder to form a mixture;
    forming a green liner for an induction furnace from the mixture;
    heating the green liner to a temperature above about 1100° C. to cure and bake the green liner and make a liner; and
    adjusting the electrical conductivity of the liner by regulating the ratio of graphite particles and silicon carbide particles in the mixture so that the liner has a higher electrical conductivity than the electrical conductivity of the metal to be melted when the metal is in a solid state but lower than the electrical conductivity of the metal to be melted when the metal is in a molten state,
    wherein forming and heating are conducted outside an inductive furnace.

* * * * *